United States Patent
Myrex et al.

(10) Patent No.: US 10,589,727 B1
(45) Date of Patent: Mar. 17, 2020

(54) ADJUSTABLE MOTOR MOUNT FOR SEMI-TRAILER LANDING GEAR

(71) Applicants: Kelvin Lee Myrex, Bremen, AL (US); Russell Van Freeman, Bremen, AL (US)

(72) Inventors: Kelvin Lee Myrex, Bremen, AL (US); Russell Van Freeman, Bremen, AL (US)

( * ) Notice: Subject to any disclaimer, the term of this patent is extended or adjusted under 35 U.S.C. 154(b) by 304 days.

(21) Appl. No.: 15/346,628

(22) Filed: Nov. 8, 2016

Related U.S. Application Data

(60) Provisional application No. 62/285,765, filed on Nov. 9, 2015.

(51) Int. Cl.
*B60S 9/02* (2006.01)
*B60S 9/22* (2006.01)

(52) U.S. Cl.
CPC .. *B60S 9/22* (2013.01); *B60S 9/02* (2013.01)

(58) Field of Classification Search
CPC .... B60S 9/02; B60S 9/22; B60S 9/215; B60S 9/21; B60S 9/205; B60S 9/08; F16M 11/08; F16M 11/10; F16M 11/2014; F16M 11/2021; B62D 59/04
USPC ......... 248/274.1, 282.1, 283.1, 284.1, 285.1; 16/243, 244, 248; 180/11, 12, 15, 202, 180/298, 299; 280/763.1, 764.1, 765.1, 280/766.1; 254/419
See application file for complete search history.

(56) References Cited

U.S. PATENT DOCUMENTS

| 3,895,682 A * | 7/1975 | Graham | B60D 1/66 180/313 |
| 4,281,852 A * | 8/1981 | Konkle | B60S 9/12 280/766.1 |
| 4,345,779 A * | 8/1982 | Busby | B60S 9/20 280/766.1 |
| 5,050,845 A * | 9/1991 | Aline | B60S 9/12 254/419 |
| 5,058,236 A * | 10/1991 | Henson | E05D 7/0027 16/222 |
| 5,933,919 A * | 8/1999 | Miller | E05D 7/0018 16/241 |
| 6,086,099 A * | 7/2000 | Kingsbury | B60S 9/08 254/419 |
| 6,189,458 B1 * | 2/2001 | Rivera | B60N 3/001 108/150 |

(Continued)

*Primary Examiner* — Jonathan Liu
*Assistant Examiner* — Guang H Guan
(74) *Attorney, Agent, or Firm* — Lanier Ford Shaver & Payne, PC; Gerald M. Walsh, Esq.

(57) ABSTRACT

An adjustable motor mount having a first plate with a first side and a second opposite side, a second plate, and a third plate. The first plate is connected to the second plate with a first hinge and the second plate is connected to the third plate with a second hinge. The second plate is rotatable relative to the first plate and the third plate is rotatable relative to the second plate. The third plate can be raised or lowered relative to the first plate and can be moved towards or away from the first plate. The first plate and the second plate may have spaced hinge members, as an alternate embodiment so that the second plate is slidable towards the first side and the second side of the first plate. The adjustable motor mount allows a motor to be easily moved upward, downward, left, right, towards, and away from a crank shaft of a landing gear drive mechanism.

12 Claims, 2 Drawing Sheets

(56) References Cited

U.S. PATENT DOCUMENTS

| | | | | |
|---|---|---|---|---|
| 6,945,504 B2* | 9/2005 | Chen | ............... | H02G 11/00 |
| | | | | 174/69 |
| 7,328,884 B2* | 2/2008 | Garceau | ............ | B60S 9/06 |
| | | | | 254/126 |
| 7,469,806 B2* | 12/2008 | Garoffolo | ......... | B60R 9/042 |
| | | | | 224/310 |
| 7,648,112 B2* | 1/2010 | Wu | ............... | F16M 11/045 |
| | | | | 248/282.1 |
| 8,052,125 B2* | 11/2011 | Garceau | ............ | B60S 9/06 |
| | | | | 254/103 |
| 8,235,008 B2* | 8/2012 | Axelrod | ......... | A01K 1/0245 |
| | | | | 119/499 |
| 8,905,872 B2* | 12/2014 | Ennis | ............ | A63B 63/004 |
| | | | | 473/478 |
| 8,941,978 B2* | 1/2015 | Fang | ............... | F16M 13/02 |
| | | | | 248/80 |
| 9,271,884 B2* | 3/2016 | Mitchell | .......... | A61G 5/10 |
| 9,469,280 B2* | 10/2016 | Baird | ............... | B60S 9/08 |
| 9,677,307 B2* | 6/2017 | McCuistion | ...... | E05D 3/022 |
| 2015/0014506 A1* | 1/2015 | Brennan | ...... | A47B 21/0314 |
| | | | | 248/274.1 |

* cited by examiner

US 10,589,727 B1

ADJUSTABLE MOTOR MOUNT FOR SEMI-TRAILER LANDING GEAR

CROSS-REFERENCE TO RELATED APPLICATIONS

This application claims priority of U.S. Provisional Application Ser. No. 62/285,765 filed on Nov. 9, 2015, the disclosure of which is incorporated herein by reference.

FIELD OF THE INVENTION

This invention relates to adjustable motor mounts and, particularly, to an adjustable motor mount for attaching a motor to the crank shaft of the landing gear of a semi-trailer.

BACKGROUND OF THE INVENTION

Many semi-trailers have a front landing gear for support of the front of the trailer when the tractor is detached. Such landing gears generally have two spaced-apart, telescoping or Jack-type landing gear legs and feet which extend downwardly from the floor of the trailer. Each leg is operatively attached to screw and follower or a rack and pinion gear arrangement which is driven by a landing gear drive shaft which extends between the legs and which causes extension or retraction of the legs and feet depending on the direction in which it is rotated.

Traditionally, a hand operable handle or crank is attached to the landing gear drive shaft by a pin or bolt which serves as a hinge connection allowing the handle to be pivoted out of the way while not in use. Manual rotation of the handle in one direction causes extension of the feet and lifting of the trailer to, for example, separate the trailer from a semi-tractor, and requires considerable time and effort on the part of the person manually rotating the hand crank. Manually operated jack structures, however, are often difficult to use, require much time for their operation and expose the operator to potential injuries as he is positioned next to the trailer while turning the crank to raise or lower the landing gear to in turn raise or lower the trailer.

A number of devices for mechanically or electrically extending and retracting the landing gear of a semi-trailer are known. These devices are, in general, cumbersome and expensive and generally require installation of such devices on the semi-trailer at the time of installation of the landing gear thereon. Owing primarily to the complexity and expense of the prior art systems, they have not enjoyed widespread acceptance in the trucking industry. Also, the complexity of such systems has rendered them relatively fragile and therefore generally unsuited to the rugged environment to which over-the-road semi-trailers are subjected daily.

What is needed is a simple, adjustable motor mount system for easy installation beneath the floor of a semi-trailer which will allow rapid and easy alignment and attachment of the drive shaft of the motor to the crank shaft of the landing gear of the semi-trailer.

SUMMARY OF THE INVENTION

The present invention is an adjustable motor mount having a first plate with a first side, a second opposite side, a second plate, and a third plate. A first is hinge positioned between the first plate and the second plate. A second hinge is positioned between the second plate and the third plate. The second plate is rotatable relative to the first plate and the third plate is rotatable relative to the second plate. The third plate can be raised or lowered relative to the first plate and the third plate can be moved towards or away from the first plate. The first plate and the second plate having spaced hinge members so that the second plate and the third plate are slidable towards the first side and the second side of the first plate. The first plate is mountable to the frame of a semi-trailer and the third plate is mountable to a motor.

The adjustable motor mount is useful for aligning a drive shaft of a motor to the crank shaft of a landing gear drive mechanism of a semi-trailer. A motor is attached to the third plate and the first plate is attached to the frame of a semi-trailer. The shaft of the motor is aligned with the crank shaft of the landing gear drive mechanism by moving the third plate towards or away from the first plate. The shaft of the motor is further aligned with the crank shaft of the landing gear drive mechanism by moving the third plate upwards or downwards relative to the first plate. The shaft of motor is attached to the crank shaft of the landing gear drive mechanism by moving the third plate towards the shaft of the landing gear drive mechanism. The shaft of the motor is removed from the drive shaft of the landing gear drive mechanism by moving the third plate away from the crank shaft of the landing gear drive mechanism.

An advantage of the adjustable motor mount of the present invention is a motor mount that allows the motor to be easily moved upward, downward, left, right, towards, and away from the crank shaft of the landing gear drive mechanism.

Another advantage is an adjustable motor mount that is easy to install on the frame of a semi-trailer.

Another advantage is an adjustable motor mount that can fit any landing gear drive mechanism.

Another advantage is an adjustable motor mount that is rugged and durable.

DETAILED DESCRIPTION OF THE INVENTION

While the following description details the preferred embodiments of the present invention, it is to be understood that the invention is not limited in its application to the details of the method described herein, since the invention is capable of other embodiments and of being practiced in various ways.

Figure 1:
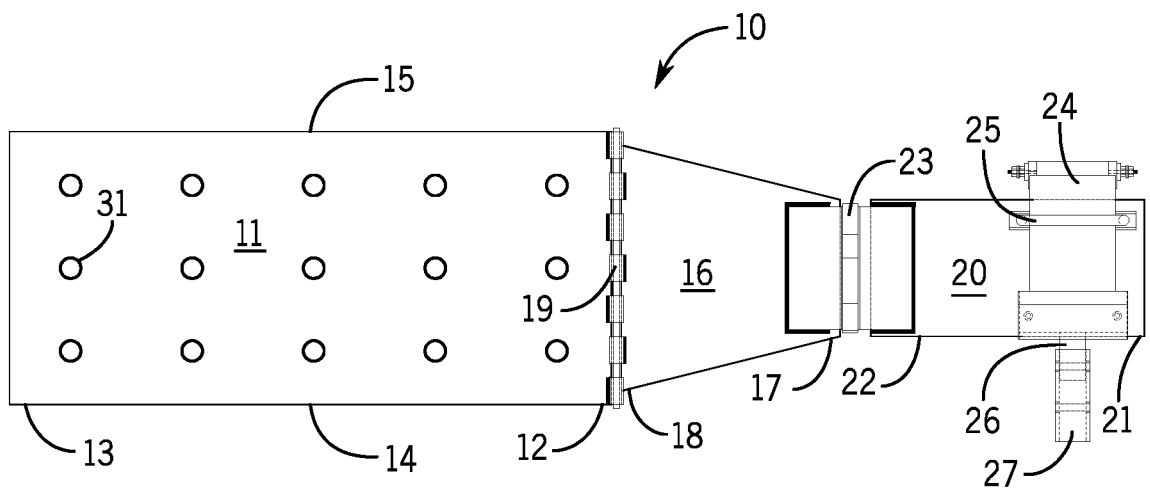
FIG. 1 illustrates a top plan view of the adjustable motor mount of the present invention.

FIG. 1 shows a top plan view of the adjustable motor mount 10 of the present invention. The motor mount has a first plate 11 having a first end 12, a second opposite end 13, a first side 14, and a second opposite side 15. The first plate 11 is designed for mounting to the frame of a semi-trailer, for example, to the floor joists. A second plate 16 has a first end 17 and a second opposite end 18. A hinge 19 connects the second plate 16 rotatably to the first plate 11. A third plate 20 has a first end 21 and a second opposite end 22. A hinge 23 connects the third plate 20 rotatably to the second plate 16. A motor 24 is shown attached to the third plate 20 near the first end 21 of the third plate 20. The motor 24 can be attached to the third plate 20 by any suitable method, for example, with a U-bolt 25. A drive shaft 26 of the motor 24 can have a connecting coupler 27 to reversibly connect the drive shaft 26 to the crank shaft 28 of a landing gear drive mechanism with a clip pin 37. (see FIG. 3).

Figure 2:
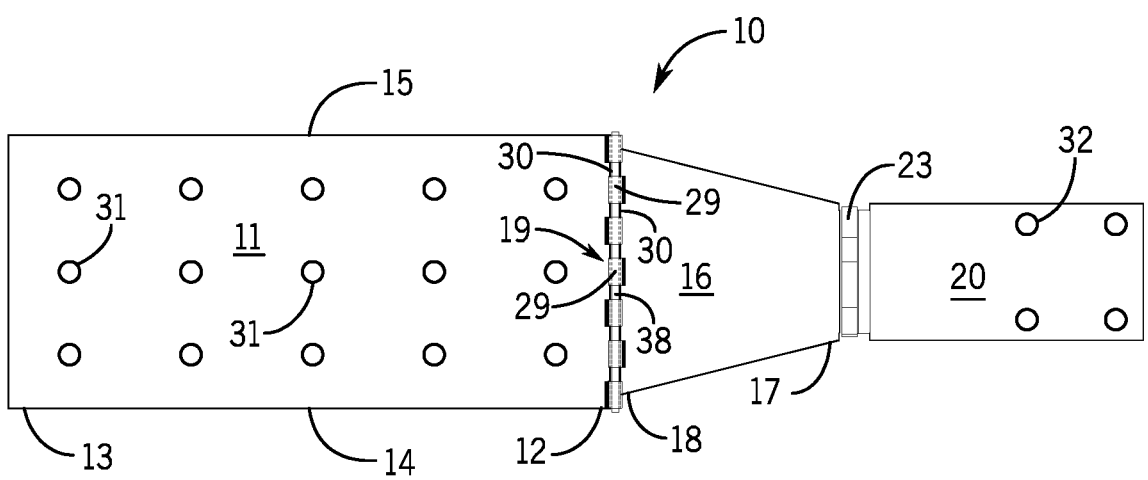
FIG. 2 illustrates a bottom perspective view of the adjustable motor mount.

FIG. 2 shows a bottom perspective view of the adjustable motor mount 10. FIG. 2 further shows that the first plate 11 and the second plate 16 have an alternate embodiment of the hinge 19 of FIG. 1. In FIG. 2, both plates 11 and 16 have hinge members 29 with spaces 30 therebetween. The hinge members 29 on the second plate 16 can slide along a hinge pin 38 in the spaces 30. Thus, second plate 16 can be moved to slide towards the first side 14 or towards the second opposite side 15 of the first plate 11, resulting in the movement of the third plate 20 towards the first side 14 or towards the second opposite side 15 of the first plate 11. With this dual hinge mechanism the third plate 20 can be moved above or below the plane of the first plate 11, toward or away from the first plate 11, and towards the first side 14 or the second opposite side 15 of the first plate 11. Holes 31 can be put in the first plate 11 for mounting the first plate 11 to the frame of a semi-trailer. Holes 32 can be put in the third plate 20 to attach the motor 24 to the third plate 20.

Figure 3:
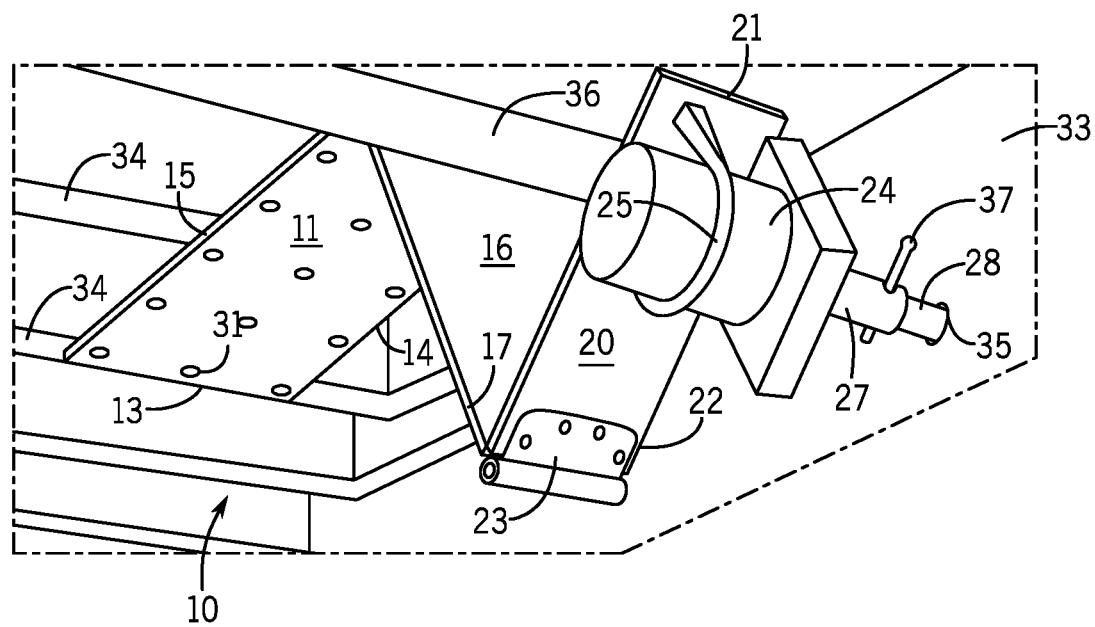
FIG. 3 shows a top perspective view of the adjustable motor mount attached to the frame of a semi-trailer, with a motor attached to the motor mount and with a drive shaft of the motor aligned with and attached to the drive shaft of a landing gear drive mechanism.

FIG. 3 shows the adjustable motor mount 10 placed under a semi-trailer 33. The first plate 11 is attached to floor joists 34 of the semi-trailer 33. A landing gear crankshaft 28 is shown extending under the semi-trailer 33 through an opening 35. The first plate 11 extends towards a landing gear drive shaft 36. The second plate 16 extends down below the landing gear drive shaft 36 and the third plate 20 extends upward. A motor 24 is attached to the third plate 20. The motor 24 can be moved up, down, left, right, towards, or away from the landing gear crankshaft 28 by means of the dual hinge mechanism of the adjustable motor mount 10. The connecting coupler 27 on the drive shaft 26 of the motor 24 can, thus, be easily aligned with the landing gear crankshaft 28. The connecting coupler 27 can then be placed over the landing gear crankshaft 28 and reversibly locked into place with the clip pin 37.

The plates can be made of any suitable metal, preferably steel. Any type of suitable motor can be used with the adjustable motor mount, preferably an electric motor. The motor can be powered and regulated to turn both clockwise and counter clockwise by methods well known in the art to raise and lower the landing gear. The motor can also be operated remotely by methods well known in the art.

The foregoing description has been limited to specific embodiments of this invention. It will be apparent, however, that variations and modifications may be made, by those skilled in the art, to the disclosed embodiments of the invention, with the attainment of some or all of its advantages and without departing from the spirit and scope of the present invention.

We claim:

1. An adjustable motor mounting system comprising:
    i) an adjustable motor mount comprising:
        a) a first plate having a first side and a second side opposite said first side, said first plate having a first end and a second end opposite the first end of said first plate, a second plate having a first end and a second end opposite the first end of said second plate, and a third plate having a first end and a second end opposite the first end of said third plate;
        b) a first hinge connecting the second end of said second plate to the first end of said first plate so that said second plate is rotatable relative to said first plate;
        c) a second hinge connecting the first end of said second plate to the second end of said third plate so that said third plate is rotatable relative to said second plate, wherein said third plate is configured to be raised or lowered relative to said first plate and said third plate is configured to be moved towards or away from said first plate; and
        d) the second end of said first plate attached to a frame of a semi-trailer, said second plate extending below a landing gear drive shaft of said semi-trailer, and said third plate extending upwards with respect to said landing gear drive shaft from said second plate; and
    ii) a motor directly attached to a surface of said third plate at the first end of said third plate, wherein the first end of said third plate remains unhinged and wherein said motor is connected to a landing gear crank shaft of said semi-trailer.

2. The adjustable motor mounting system of claim 1, wherein said first hinge comprises spaced hinge members on said first plate and on said second plate with a hinge pin therethrough so that said second plate is slidable on said hinge pin towards said first side of said first plate and towards said second side of said first plate.

3. The adjustable motor mounting system of claim 1, wherein said motor is directly attached to said third plate at the first end of said third plate by a U-bolt.

4. The adjustable motor mounting system of claim 1, further comprising a connecting coupler disposed on a drive shaft of said motor.

5. The adjustable motor mounting system of claim 4, further comprising a clip pin configured to connect said connecting coupler to said landing gear crank shaft.

6. The adjustable motor mounting system of claim 1, wherein said first plate comprises a plurality of holes for mounting said first plate to said frame of said semi-trailer.

7. The adjustable motor mounting system of claim 1, wherein said third plate comprises a plurality of holes for attaching said motor to said third plate.

8. An adjustable motor mounting system comprising:
    i) an adjustable motor mount comprising:
        a) a first plate having a first side and a second side opposite said first side, said first plate having a first end and a second end opposite the first end of said first plate, a second plate having a first end and a second end opposite the first end of said second plate, and a third plate having a first end and a second end opposite the first end of said third plate;
        b) a first hinge connecting the second end of said second plate to the first end of said first plate so that said second plate is rotatable relative to said first plate;
        c) a second hinge connecting the first end of said second plate to the second end of said third plate so that said third plate is rotatable relative to said second plate, wherein said third plate is configured to be raised or lowered relative to said first plate and said third plate is configured to be moved towards or away from said first plate, and wherein said first hinge comprises spaced hinge members on said first plate and on said second plate with a hinge pin therethrough so that said second plate is slidable on said hinge pin towards said first side of said first plate and towards said second side of said first plate; and d) the second end of said first plate attached to a frame of a semi-trailer, said second plate extending below a landing gear drive shaft of said semi-trailer, and said third plate extending upwards with respect to said landing gear drive shaft from said second plate; and ii) a motor directly attached to a surface of said third plate at the first end of said third plate by a U-bolt, wherein the first end of said third plate remains unhinged and wherein said motor is connected to a landing gear crank shaft of said semi-trailer.

9. The adjustable motor mounting system of claim 8, further comprising a connecting coupler disposed on a drive shaft of said motor.

10. The adjustable motor mounting system of claim 9, further comprising a clip pin configured to connect said connecting coupler to said landing gear crank shaft.

11. The adjustable motor mounting system of claim 8, wherein said first plate comprises a plurality of holes for mounting said first plate to said frame of said semi-trailer.

12. The adjustable motor mounting system of claim 8, wherein said third plate comprises a plurality of holes for attaching said motor to said third plate.

* * * * *